(12) United States Patent
Frisbee

(10) Patent No.: US 7,343,876 B2
(45) Date of Patent: Mar. 18, 2008

(54) COLLAPSIBLE CORNER ANIMAL CAGE

(76) Inventor: Linda Susan Frisbee, 2056 Stone Mountain Rd., Bedford, VA (US) 24523

( * ) Notice: Subject to any disclaimer, the term of this patent is extended or adjusted under 35 U.S.C. 154(b) by 134 days.

(21) Appl. No.: 11/252,453

(22) Filed: Oct. 17, 2005

(65) Prior Publication Data

US 2007/0084414 A1    Apr. 19, 2007

(51) Int. Cl.
*A01K 1/03* (2006.01)
*A01K 31/08* (2006.01)

(52) U.S. Cl. .................. 119/474; 119/461; 119/492; 119/499; 119/514

(58) Field of Classification Search .......... 119/431, 119/452, 453, 454, 461, 463, 464, 472, 474, 119/475, 480, 489, 490, 482, 491, 492, 494, 119/496, 497, 498, 499, 504, 512, 513, 514, 119/519; 220/9.2, 4.28, 4.29, 6
See application file for complete search history.

(56) References Cited

U.S. PATENT DOCUMENTS

| | | | |
|---|---|---|---|
| 1,330,404 A | 2/1920 | Sommer | |
| 2,892,562 A | 6/1959 | Smithson | |
| 4,016,833 A | 4/1977 | Ray | |
| 4,484,540 A | 11/1984 | Yamamoto | |
| 4,537,151 A | 8/1985 | Bolton | |
| 4,603,658 A * | 8/1986 | Garnsey | 119/499 |
| 4,903,637 A * | 2/1990 | Devault | 119/497 |
| 4,917,047 A | 4/1990 | Wazeter, III | |
| 5,544,619 A | 8/1996 | Braun | |
| 5,669,331 A | 9/1997 | Richmond | |
| 6,152,081 A | 11/2000 | Baker | |
| 6,192,834 B1 | 2/2001 | Kolozsvari | |
| 6,553,940 B1 | 4/2003 | Powell et al. | |
| 6,606,964 B2 | 8/2003 | Marchioro | |
| 6,832,752 B2 | 12/2004 | Cuzzocrea | |
| 2004/0134444 A1 | 7/2004 | Shiever et al. | |

OTHER PUBLICATIONS

PetEdge Winter 2005 Catalog pp. 168-184.

* cited by examiner

*Primary Examiner*—T. Nguyen
(74) *Attorney, Agent, or Firm*—DeWitt Ross & Stevens S.C.; Charles S. Sara

(57) ABSTRACT

A collapsible corner animal cage is provided. The collapsible cage comprises a first set of side walls fastened together to define the rear corner of the cage; a second set of side walls fastened to the first set of side walls to define the side corners of the cage; a door panel fastened to the second set of side walls to define the front of the cage, the door panel positioned diametrically opposite the rear corner of the cage; a floor fastened to the side walls and the door panel; and a roof fastened to the side walls and the door panel; wherein the side walls, door panel, floor and roof are fastened together to define a collapsible structure for use in a corner. The cage may also be collapsed into a one-piece, substantially flat unit with a carrying handle for transport.

5 Claims, 10 Drawing Sheets

COLLAPSIBLE CORNER ANIMAL CAGE

FIELD OF THE INVENTION

This invention relates generally to a collapsible animal cage and, more particularly, this invention relates to a collapsible animal cage for use in a corner space.

BACKGROUND

Pet owners, animal breeders, veterinarians and the like often store and/or display animals such as dogs, cats, rabbits, chickens and even horses in cages. When multiple cages are lined up next to each other, the space in corners is often under-utilized or wasted completely. This is because when a conventional cage is placed in a corner with another cage adjacent to it, the animal cannot enter the corner cage without rearranging the other cages. Thus, a need exists for a corner animal cage that can take advantage of the wasted space in corners and remain accessible when placed next to other conventional cages.

Further, animals often travel; to hotels (for vacations), horse or dog shows (for awards and prestige), county fairs (for display) and the like. Ideally, the animal uses the same cage both at home and during such travels, increasing the comfort of the animal in strange surroundings. Thus, many conventional animal cages are capable of collapsing to a smaller size for easy transport. For instance, U.S. Pat. No. 6,192,834 to Kolozsvari describes a collapsible animal cage, as do U.S. Pat. No. 5,669,331 to Richmond and U.S. Pat. No. 4,484,540 to Yamamoto, among others.

However, despite the advantages such previous collapsible cages have presented over their larger and bulkier non-collapsible brethren, significant deficiencies remain. Specifically, the transition from a collapsed state to an expanded state, or the reverse transition, is often difficult to achieve, especially when attempted by a single individual (who may be simultaneously attempting to control a distressed and highly uncooperative pet). Thus, a need exists for an animal cage for use in a corner space which will utilize heretofore wasted space and collapses for transport.

SUMMARY OF THE INVENTION

The present invention, which is defined by the claims set forth at the end of this document, is directed to a collapsible corner animal cage. A brief summary of an exemplary version of the invention (depicted in the accompanying FIGS. 1-3) is now provided to give the reader a basic understanding of some of the preferred features of the invention, with more details provided later in this document.

Referring to FIG. 1 for a depiction of an exemplary version of the invention, the collapsible corner animal cage 100 of the present invention comprises four side walls 106, 108, 110 and 112, a door panel 114, a floor 102 and a roof 104 fastened together in a substantially pentagon-like shape.

Specifically, the corner animal cage 100 of the present invention comprises a first set of side walls 108 and 110 fastened together to define a rear corner 109 of the cage 100; a second set of side walls 106 and 112 fastened to the first set of side walls 108 and 110 to define side corners 111 of the cage 100; a door panel 114 fastened to the second set of side walls 106 and 112 to define the front 113 of the cage 100, the door panel 114 preferably positioned diametrically opposite the rear corner 109 of the cage 100; a floor 102 fastened to the first set of side walls 108 and 110, the second set of side walls 106 and 112 and the door panel 114; and a roof 104 fastened to the first set of side walls 108 and 110, the second set of side walls 106 and 112 and the door panel 114. The side walls 106, 108, 110 and 112, door panel 114, floor 102 and roof 104 fasten together to define a collapsible animal cage for use in a corner.

Each side wall 106, 108, 110 and 112 has two opposing ends 116 and 118 for fastening to the floor 102 and the roof 104 and two opposing sides 120 and 122 for fastening to other side walls and/or the door panel 114. For instance, end 116 of each side wall 106, 108, 110 and 112 is fastened to the roof 104, while opposing end 118 of each side wall 106, 108, 110 and 112 is fastened to the floor 102. Similarly, side 120 of each side wall 106, 108, 110 and 112 fastens to the opposing side 122 of side walls 106 and 112 or the door panel 114. For instance, side 120 of side wall 106 and side 122 of side wall 112 fasten to the door panel 114, while side 120 of side wall 112 and side 122 of side wall 106 fasten to sides 120 and 122 of the first set of side walls 108 and 110.

The door panel 114 is fastened to the second set of side walls 106 and 112 to define the front 113 of the cage 100. The door panel 114 is preferably positioned diametrically opposite the rear corner 109 of the cage 100. The door panel 114 also preferably contains a hingedly-connected door 136. This allows the door 136 to swing open to allow an animal to enter and/or exit the cage 100 without removing the entire door panel 114 from the cage 100.

Referring to FIG. 2A, the floor 102 is shown. The floor 102 is substantially pentagon-like in shape and comprises two panels 124 and 126. Each panel 124 and 126 has four sides. A first side 131 fastens to the door panel 114. A second side 132 fastens to the second set of side walls 106 and 112. A third side 133 fastens to the first set of side walls 108 and 110. The fourth side 134 fastens to the fourth side 134 of the adjacent floor panel.

Similarly, referring now to FIG. 2B, the roof 104 is shown. The roof 104 is also substantially pentagon-like in shape and comprises two panels 128 and 130. Each panel 128 and 130 has four sides. A first side 131 fastens to the door panel 114. A second side 132 fastens to the second set of side walls 106 and 112. A third side 133 fastens to the first set of side walls 108 and 110. The fourth side 134 fastens to the fourth side 134 of the adjacent roof panel.

The side walls 106, 108, 110 and 112, door panel 114, floor 102 and roof 104 of the corner cage 100 are preferably fastened together using at least one suitable fastener 146. The side walls 106, 108, 110 and 112, door panel 114, floor 102 and roof 104 of the corner cage 100 may be releasably fastened together or movably fastened together. When releasably fastened together, the side walls 106, 108, 110 and 112, door panel 114, floor 102 and roof 104 may be completely separated from each other. When movably fastened together, the side walls 106, 108, 110 and 112, door panel 114, floor 102 and roof 104 remain attached to each other but allow the rotation of a given side wall, door, floor or roof away from another.

Referring to FIG. 3, the animal cage 100 of the present invention is shown collapsed into a single, substantially flat unit 200. To collapse, roof panel 128 is released from side walls 106 and 108, rotated about its fasteners 146, and positioned against side wall 110. Next, the door panel 114 is released from floor panels 124 and 126 and roof panels 128 and 130, rotated about its fasteners 146, and positioned against side wall 106. Then, side wall 112 is released from floor panels 124 and 126 and roof panels 128 and 130, rotated on its fasteners 146, and positioned against side wall 110. The roof panel 130 rotates on its remaining fasteners 146 and is positioned against side wall 110, with side wall 112 disposed between side wall 110 and roof panels 128 and 130. Then, side wall 106, with the door panel 114 against it, is rotated about its fasteners 146 and positioned against side wall 108. At this point, the floor panels 124 and 126, movably fastened to the first set of side walls 108 and 110, are drawn upwardly and inwardly towards the rear corner 109 of the cage 100. As the floor panels 124 and 126 are drawn towards the rear corner 109, side wall 108, with side wall 106 and door panel 114 positioned against it, is drawn towards side wall 110. Side walls 108 and 110 are then secured together with a fastener 204. At this point, the corner animal cage 100 of the present invention has been collapsed into a substantially flat, one-piece unit 200. In a preferred version, a carrying handle 202 is provided to carry the collapsed cage 200.

Referring now to FIG. 4, the advantages of the collapsible corner animal cage 100 of the present invention are shown. FIG. 4 shows the animal cage 100 of the present invention positioned in a corner space, surrounded on both sides by conventional (i.e., box-like) animal cages. FIG. 4 clearly illustrates how the animal cage 100 of the present invention is suitable for use in a corner space, utilizing heretofore wasted space in storage facilities such as a home, barn, clinic, travel trailer and the like. The unique configuration of the corner animal cage 100 of the present invention allows at least one animal to be housed in a convenient manner, even in a corner space.

The corner animal cage 100 can be quickly and easily collapsed into a one-piece, substantially flat unit 200 for transport. The releasable engagement of the side walls, door panel, floor and roof reduces the need to manually position both side walls during the transformation of the collapsible cage into either an expanded or collapsed configuration. It also reduces the size of the collapsible cage in the collapsed configuration.

Further advantages, features, and objects of the invention will be apparent from the following detailed description of the invention in conjunction with the associated drawings.

DETAILED DESCRIPTION OF THE INVENTION

It should be understood that the version of the invention described in the Summary above is merely an exemplary preferred one, and numerous modifications to the collapsible corner animal cage 100 are also considered to be within the scope of the invention.

Figure 1:
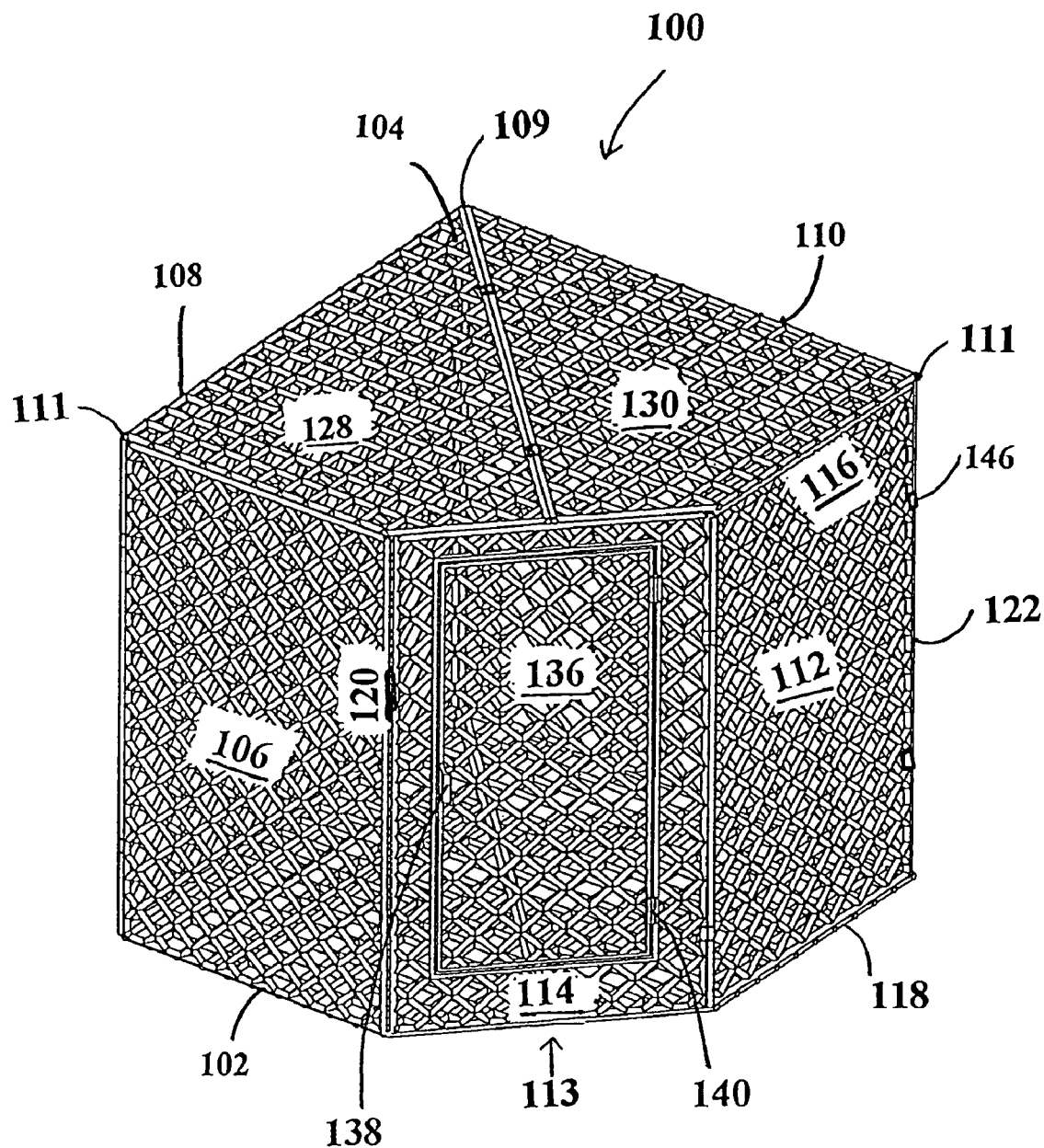
FIG. 1 is a perspective view of the collapsible corner animal cage of the present invention.
Figure 2A:
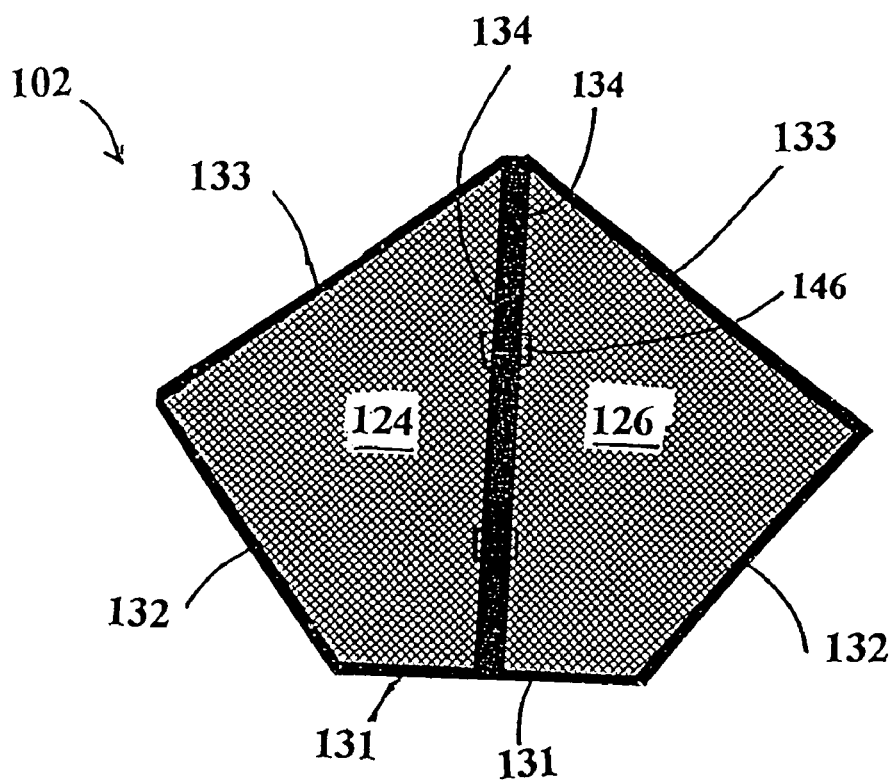
FIG. 2A is a top view of the floor of the animal cage of the present invention.
Figure 2B:
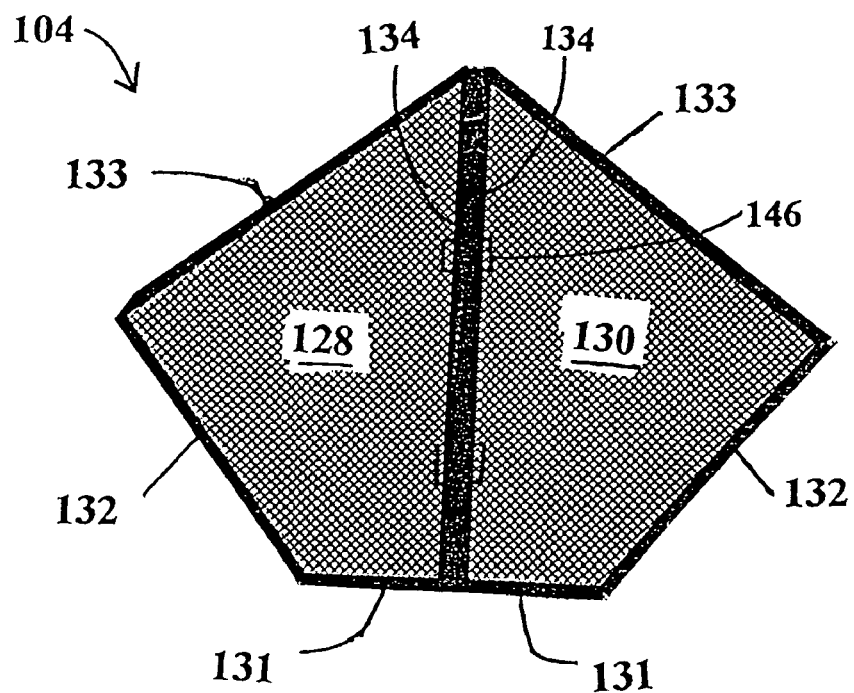
FIG. 2B is a top view of the roof of the animal cage of the present invention.
Figure 3:
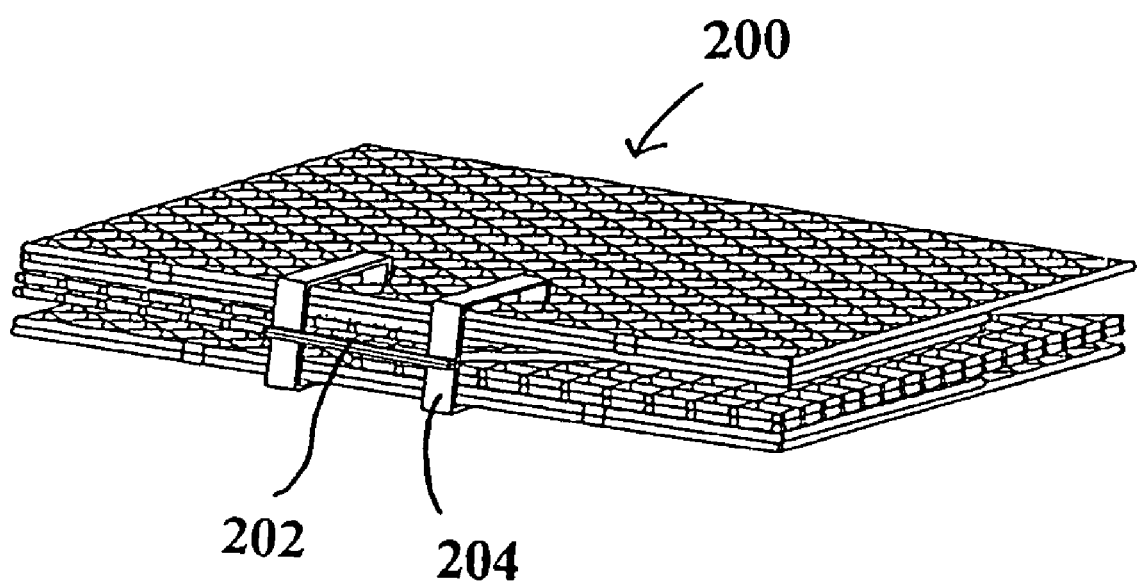
FIG. 3 is a perspective view of the corner animal cage in its collapsed form.
Figure 4:
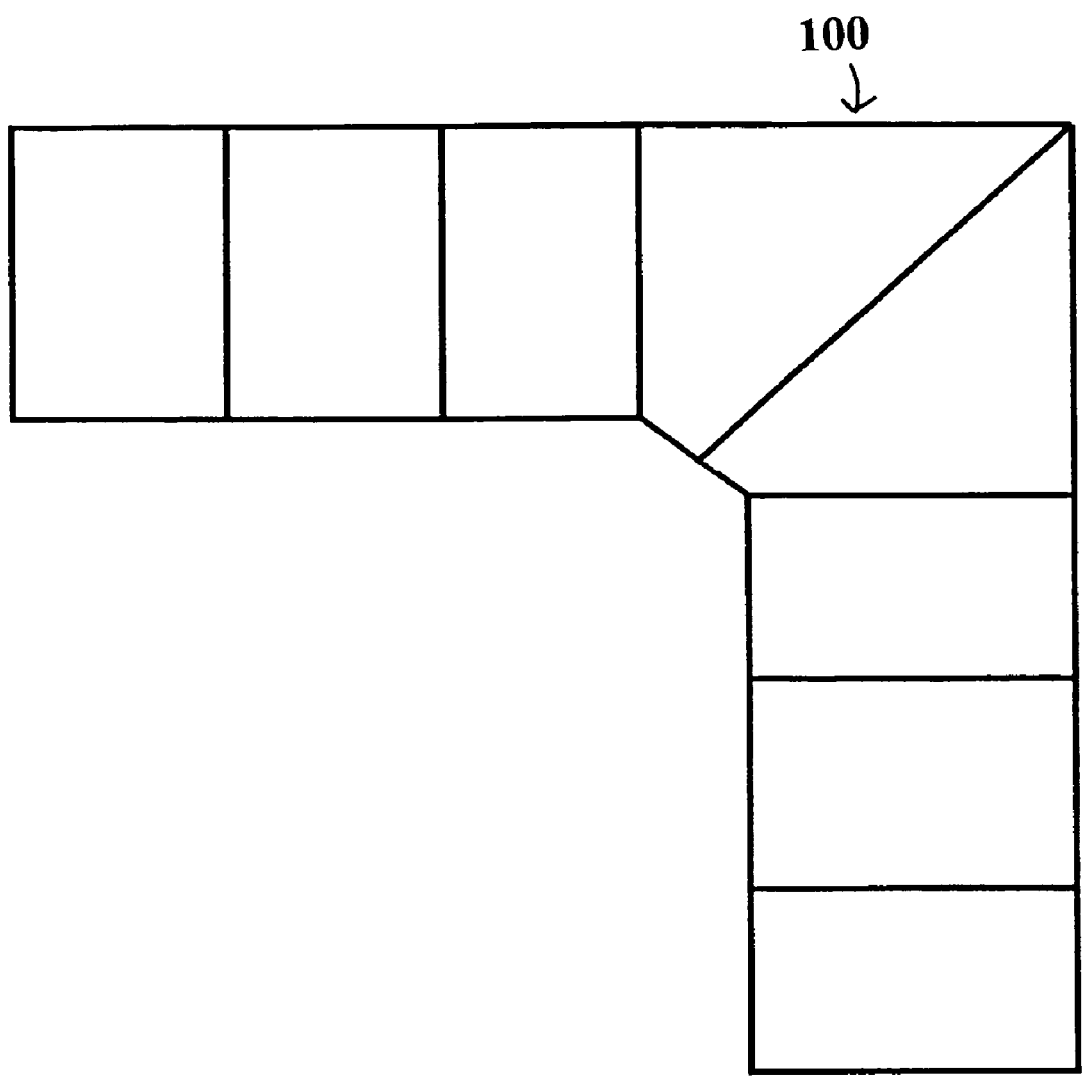
FIG. 4 is a top view of the corner animal cage in use in a corner space, surrounded by other conventional animal cages.
Figure 5:
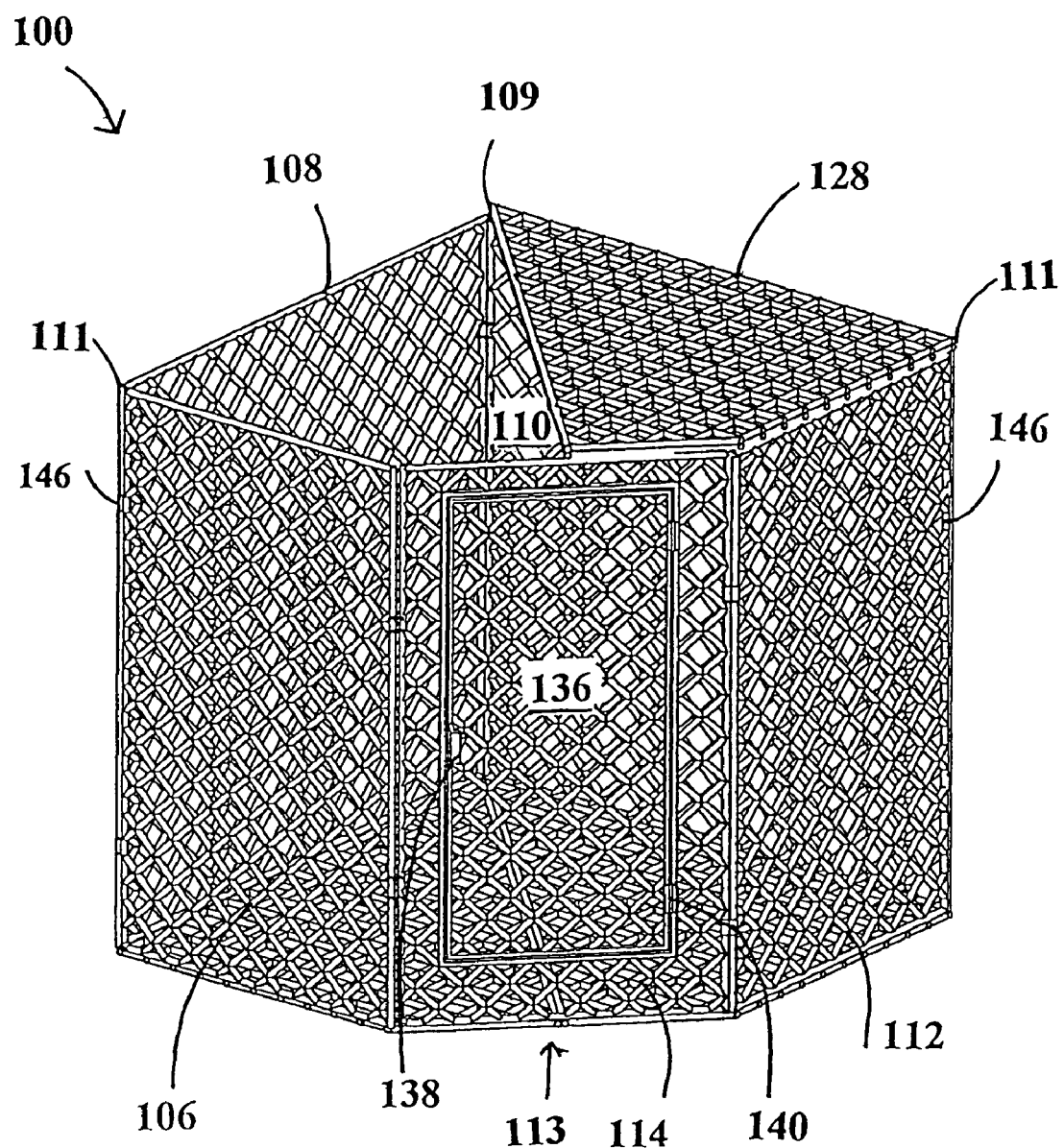
FIG. 5 is a perspective view of the corner animal cage 100 with roof panel 128 rotated about its fasteners 146 onto roof panel 130.
Figure 6:
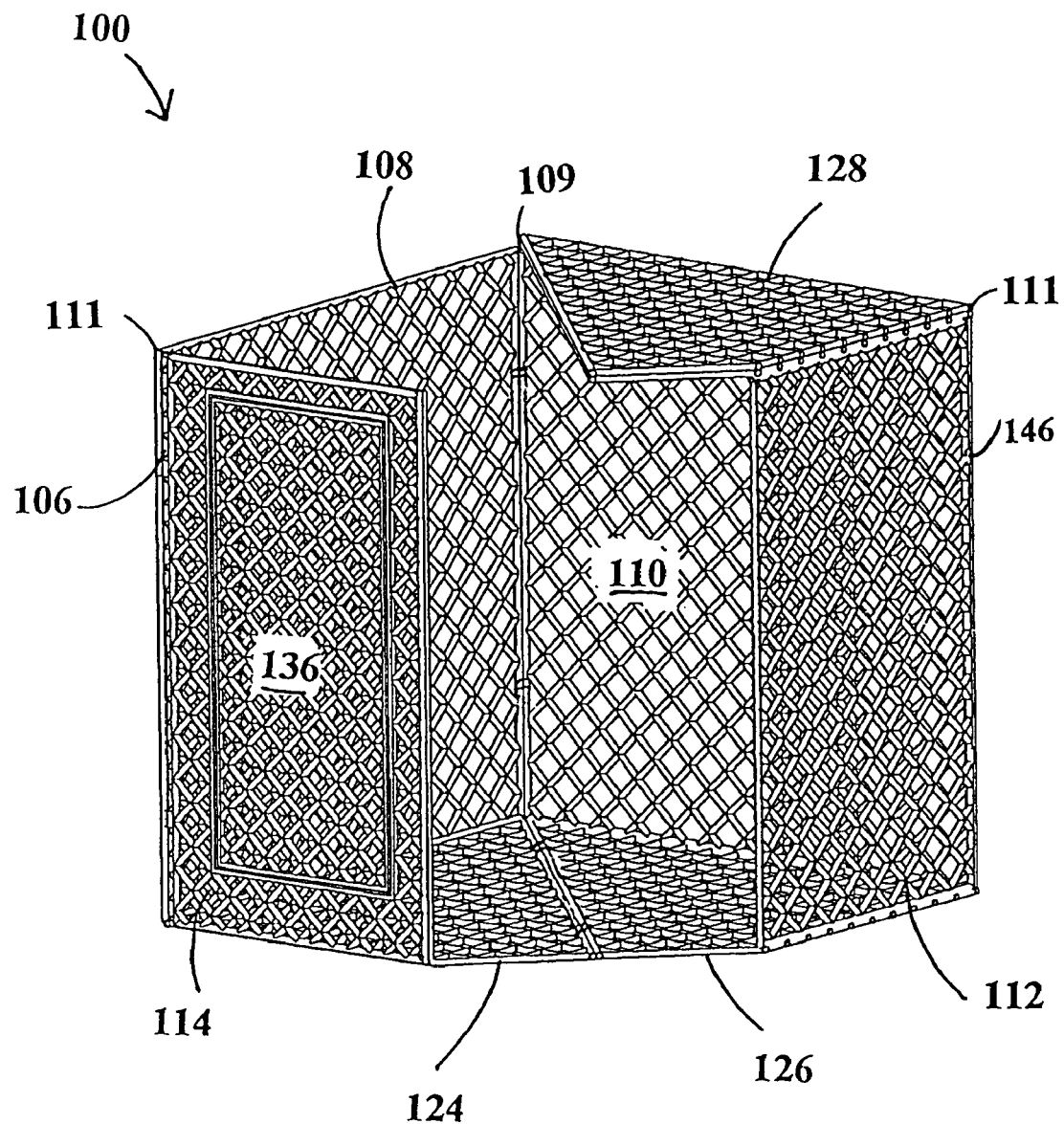
FIG. 6 is a perspective view of the corner animal cage 100 with the door panel 114 positioned against side wall 106.
Figure 7:
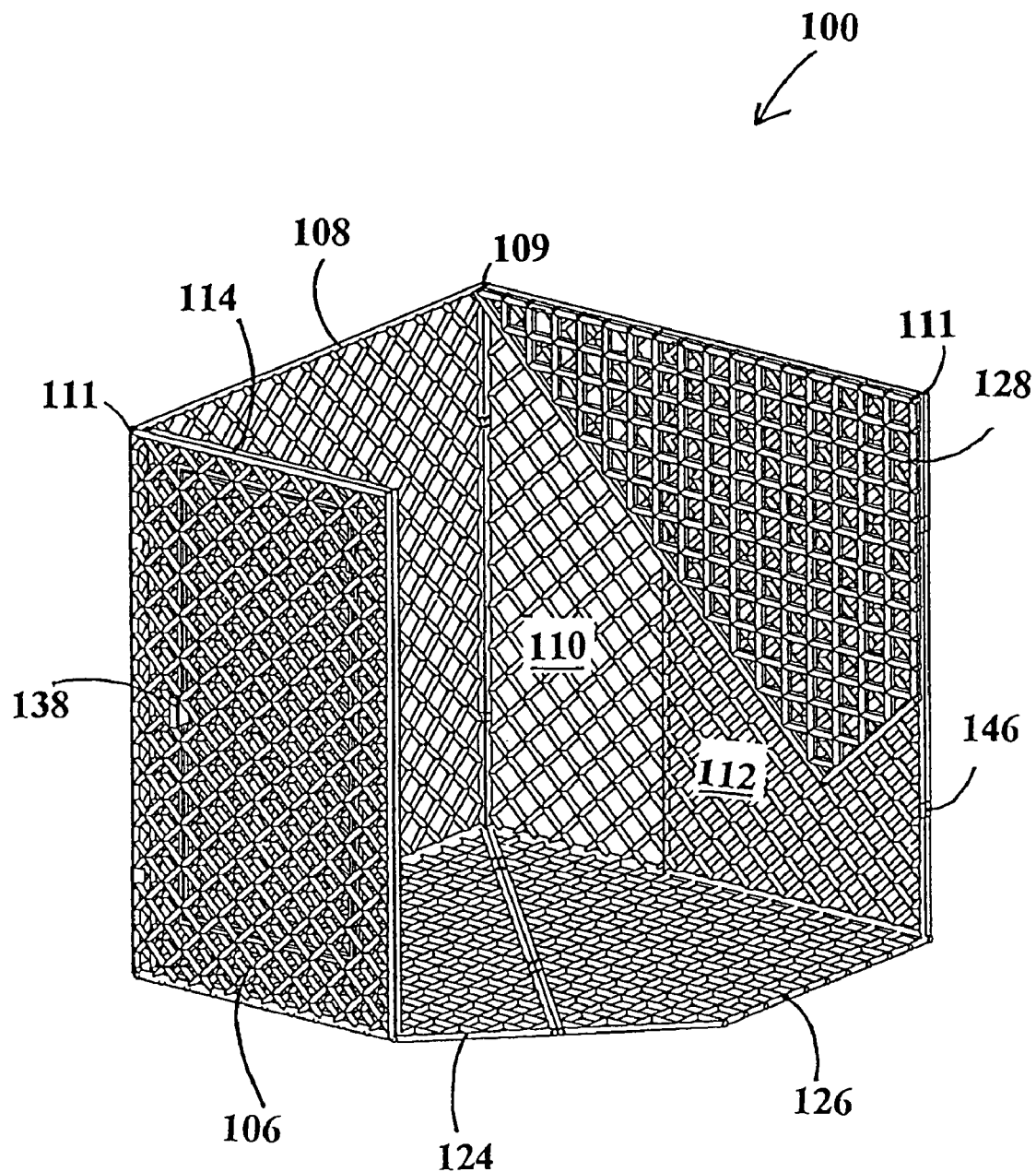
FIG. 7 is a perspective view of the corner animal cage 100 with the roof panels 128 and 130 collapsed against side wall 112, with side wall 112 disposed between the roof panels 128 and 130 and side wall 110.
Figure 8:
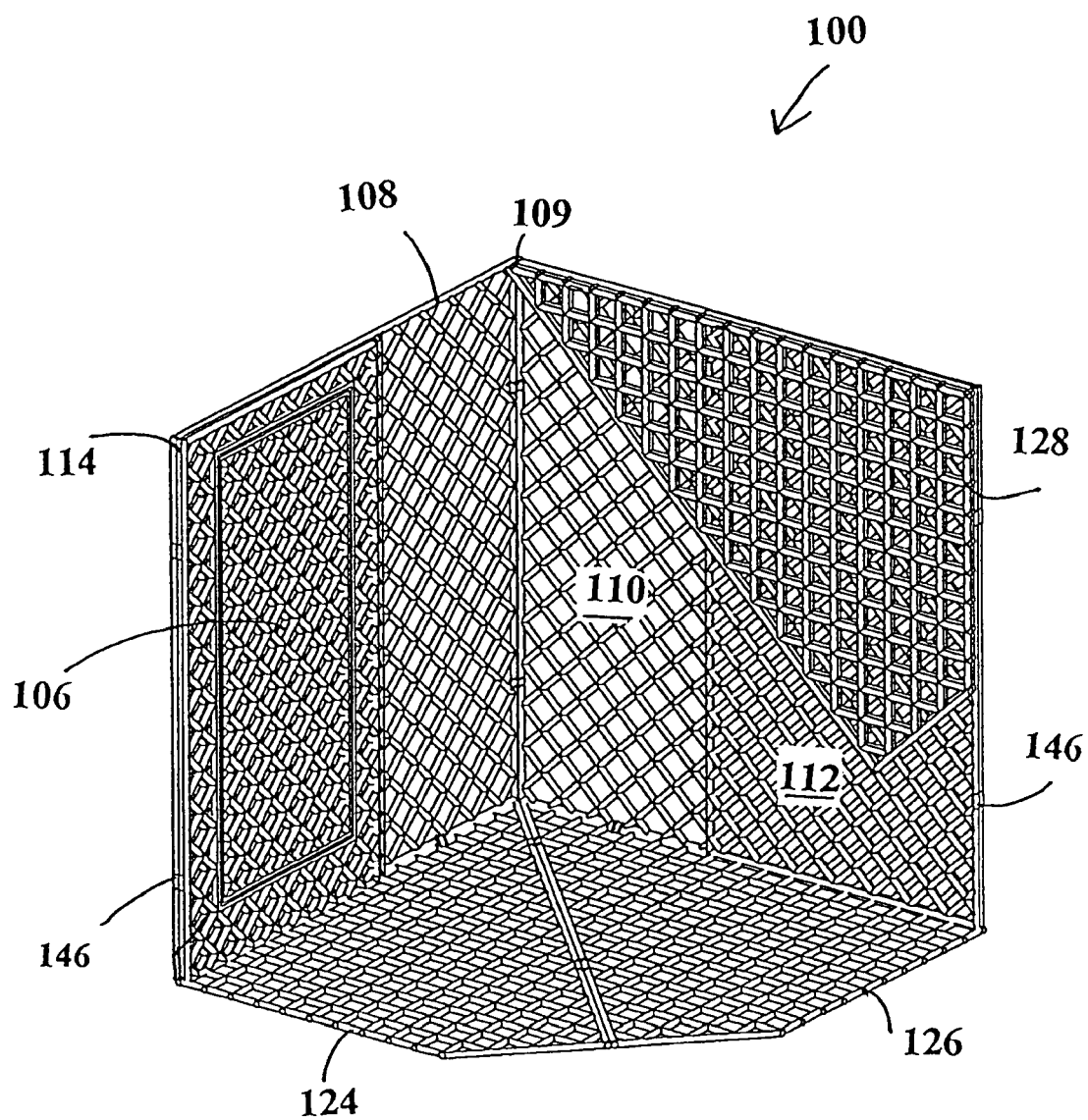
FIG. 8 is a perspective view of the corner animal cage 100 with side wall 106 and door panel 114 rotated about its fasteners 146 and positioned against side wall 108.
Figure 9:
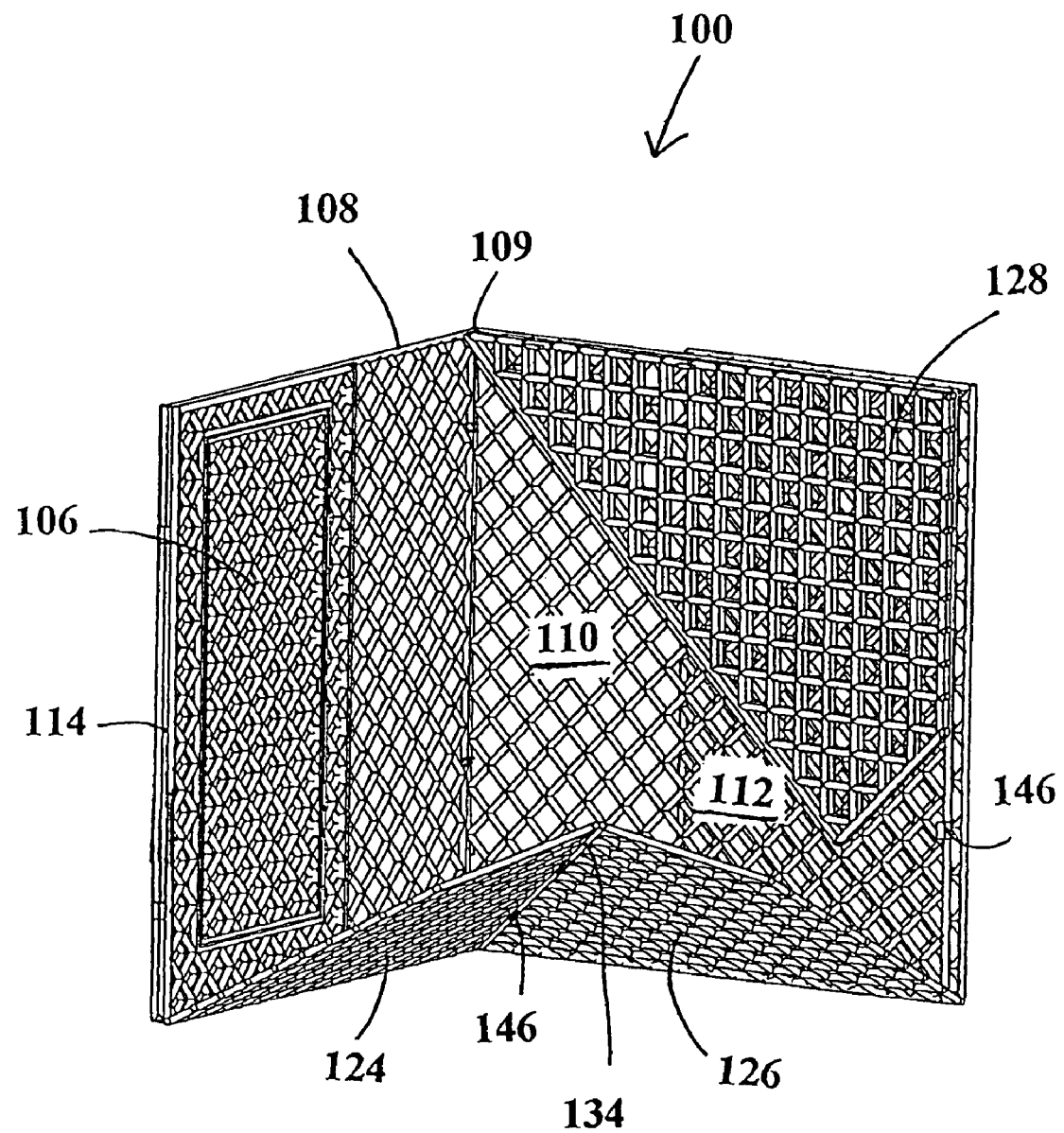
FIG. 9 is a perspective view of the corner animal cage 100 showing the floor panels 124 and 126 rotating about its fasteners 146 towards the rear corner 109 of the cage 100.

Referring now to FIGS. 1, 2A and 2B, the collapsible corner animal cage 100 of the present invention is shown. The cage 100 comprises a first set of side walls 108 and 110 fastened together to define an approximately 90 degree angle. A second set of side walls 106 and 112 fasten to the first set of side walls 108 and 110 to define approximately 90 degree angles. The door panel 114 fastens to the second set of side walls 106 and 112 to define an approximately 135 degree angle between the door panel 114 and the side walls 106 and 113. The floor 102 and the roof 104 fasten to the first set of side walls 108 and 110, the second set of side walls 106 and 112 and the door panel 114. In combination, the first set of side walls 108 and 110, the second set of side walls 106 and 112, the door panel 114, the floor 102 and the roof 104 define a collapsible cage 100 suitable for use in a corner space.

The side walls 106, 108, 110 and 112, the door panel 114, the floor 102 and the roof 104 of the corner cage 100 are preferably fastened together using at least one fastener 146. In a preferred version, at least two fasteners 146 are used. Further, the side walls 106, 108, 110 and 112, door panel 114, floor 102 and roof 104 of the corner cage 100 may be releasably fastened together or movably fastened together. When releasably fastened together, the side walls 106, 108, 110 and 112, the door panel 114, the floor 102 and the roof 104 may be completely separated from each other. When movably fastened together, the side walls 106, 108, 110 and 112, the door panel 114, the floor 102 and the roof 104 remain attached to each other but allow the rotation of a given side wall, door, floor or roof around its fasteners 146.

The first set of side walls 108 and 110, the second set of side walls 106 and 112, and the door panel 114 each has a first end 116 and an opposing second end 118. The first ends 116 fasten to the roof 104 while ends 118 fasten to the floor 102. Each also has a first side 120 and an opposing second side 122. The first sides 120 fasten to the sides 122 of either an adjacent side wall or door panel 114.

The first set of side walls 108 and 110 movably fasten together at sides 120 and 122 to define an approximately 90 degree angle. This angle defines the rear corner 109 of the cage 100. The second set of side walls 106 and 112 movably fasten to the first set of side walls 108 and 110 at sides 120 and 122 to define two opposing angles of approximately 90degrees. These angles define the side corners 111 of the cage 100.

The second opposing ends 118 of the first set of side walls 108 and 110 are movably fastened to the floor 102. The first end 116 of side wall 108 is releasably fastened to the roof 104. The first end 116 of side wall 110 is movably fastened to the roof 104.

The second ends 118 of the second set of side walls 106 and 112 fasten to the floor 102. End 118 of side wall 106 is releasably fastened to the floor 102, while end 118 of side wall 112 is movably fastened to the floor 102.

The door panel 114 fastens to the second set of side walls 106 and 112 at sides 120 and 122 to define an approximately 135 degree angle between the door panel 114 and the side walls 106 and 112. This defines the front 113 of the cage 100. The door panel 114 is thus positioned diametrically opposite the rear corner 109 of the cage 100. The door panel 114 is releasably fastened to side 122 of side wall 112 and movably fastened to side 120 of side wall 106. The door panel 114 also preferably contains a hingedly-connected door 136. The door 136 is preferably attached to the door panel 114 by a set of hinges 140. However, other forms of attachments may also be used. The door 136 also preferably has a handle 138 and is capable of swinging substantially outwardly from the door panel 114 to allow an animal to enter and/or exit the cage 100.

The floor 102 comprises two individual panels 124 and 126 movably fastened together with at least one fastener 146 (FIG. 2A). Each panel 124 and 126 comprises a first side 131, a second side 132, a third side 133 and a fourth side 134. The panels 124 and 126 are preferably movably fastened together at the fourth side 134 of panels 124 and 126. The first sides 131 of each panel 124 and 126 are releasably fastened to the second end 118 of the door panel 114. The second sides 132 of the panels 124 and 126 are releasably fastened to end 118 of the second set of side walls 106 and 112. The third sides 133 of the panels 124 and 126 are movably fastened to end 118 of the first set of side walls 108 and 110.

Similarly, the roof 104 comprises two individual panels 128 and 130 movably fastened together with at least one fastener 146 (FIG. 2B). Each panel 128 and 130 comprises a first side 131, a second side 132, a third side 133 and a fourth side 134. The panels 128 and 130 are preferably movably fastened together at the fourth side 134 of panels 128 and 130. The first sides 131 of each of the panels 128 and 130 are preferably releasably fastened to end 116 of the door panel 114. The second sides 132 of the panels 128 and 130 are preferably releasably fastened to ends 116 of the second set of side walls 106 and 112. The third sides 133 are preferably fastened to ends 116 of the first set of side walls 108 and 110. The third side 133 of panel 128 is releasably fastened to end 116 of side wall 108. The third side 133 of panel 130 is movably fastened to end 116 of side wall 110.

The first set of side walls 108 and 110, the second set of side walls 106 and 112, the door panel 114, the floor 102 and the roof 104 are preferably fastened together using at least one fastener 146. In a preferred version, at least two fasteners 146 fasten each side wall 106, 108, 110 and 112, door panel 114, floor panels 124 and 126 and roof panels 128 and 130 to each other. Any suitable fastener 146 may be used, including but not limited to such fasteners 146 as loops, rings, hooks or the like. Further, multiple types of fasteners 146 may be used. For instance, movable fasteners 146 may include hinges, piano hinges, and the like. In contrast, a releasable fastener 146 may include a hook-and-eye, a clinch fastener, and the like.

The animal cage of the present invention is collapsible into a single one-piece, substantially flat unit 200. Referring now to FIGS. 5-10, the collapsible corner animal cage 100 of the present invention is shown in various stages of collapse. The animal cage 100 collapses into a single one-piece unit 200 in a six step process.

In step one (FIG. 5), the roof 104, comprising two individual panels 128 and 130, is collapsed by releasing the fasteners 146 on the second and third sides 132 and 133 of the roof panel 128 from ends 116 of side walls 106 and 108. This leaves roof panel 128 releasably fastened to the fourth side 134 of the roof panel 130. Roof panel 128 is then rotated about its fasteners 146 to the fourth side 134 of panel 130 and positioned against roof panel 130.

In step two (FIG. 6), opposing ends 116 and 118 of the door panel 114 are released from their fasteners 146 to the first sides 131 of the roof panels 128 and 130 and the floor panels 124 and 126. Then, side 120 of the door panel 114 is released from its fasteners 146 to side 122 of side wall 112, leaving the door panel 114 movably fastened to side 120 of side wall 106 via fasteners 146. The door panel 114 is then rotated on its remaining fasteners 146 to side wall 106 and positioned against it.

In step three (FIG. 7), side wall 112 is rotated and positioned against side wall 110. This is accomplished by releasing the fasteners 146 on the end 116 of side wall 112 from the second side 132 of the roof panel 130 and releasing the fasteners 146 of opposing end 118 from the second side 132 of the floor panel 126. Then, roof panels 128 and 130 are rotated about their fasteners 146 between side wall 112 and roof panel 130 and positioned against side wall 112. Thus, side wall 112 is disposed between the roof panels 128 and 130 and side wall 110.

In step four (FIG. 8), side wall 106, having the door panel 114 positioned against it, is rotated about its fasteners 146 to side wall 108 and positioned against side wall 108. At this point, side wall 106 is disposed between side wall 108 and the door panel 114.

In step five (FIG. 9), floor panels 124 and 126 are rotated about their fasteners 146 at the fourth side 134 of each panel 124 and 126 and drawn upwardly and inwardly toward the rear corner 109 of the cage 100. As the floor panels 124 and 126 are drawn towards the rear corner 109, side walls 108 and 110 are drawn closer together.

Figure 10:
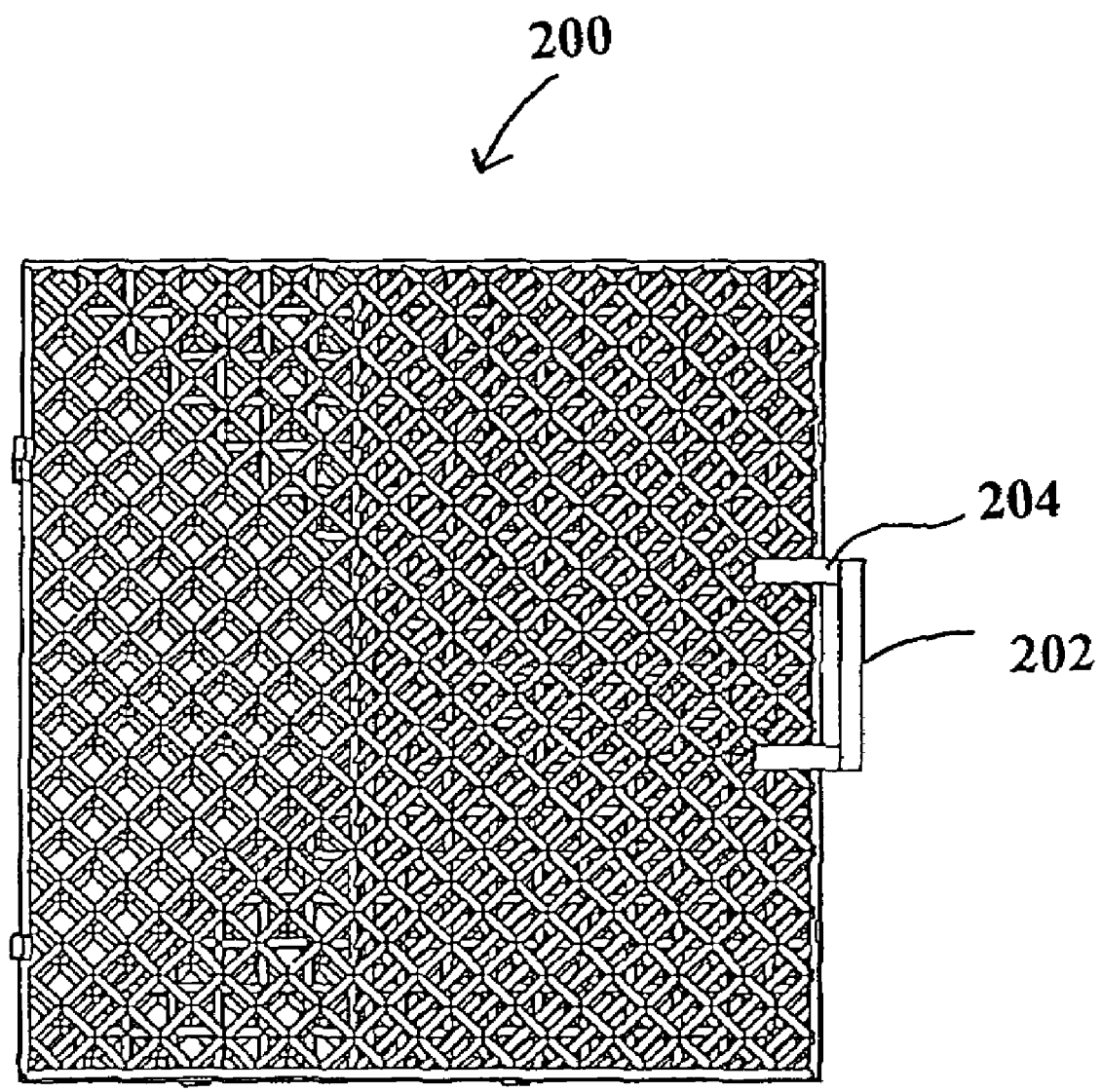
FIG. 10 is a top view of the corner animal cage 100 in its collapsed form 200.

Finally, in step six, side wall 108, having side wall 106, door panel 114, and floor panels 124 and 126 positioned against it, is rotated on its remaining fasteners 146 to side wall 110 and positioned against it. Side wall 110 has roof panels 128 and 130 disposed between side wall 110 and side wall 112. The panels 108 and 110 are then secured in position against each other with at least one fastener 204. (Any suitable fastener may be used, including hooks, loops, ties, and the like). At this point, the animal cage 100 of the present invention has been collapsed into a single, one-piece unit 200 (FIG. 10).

The collapsed animal cage 200 preferably has a carrying handle 202. The handle 202 is preferably attached to the collapsed cage 200 after collapse. However, in alternate versions, the handle 202 is an integral part of the cage. The handle 202 can be of any material suitable to carry the collapsed cage 200, including but not limited to metal, fabric, elastic, plastic, and the like.

The collapsible corner animal cage 100 of the present invention is preferably made of a lightweight metal such as steel or aluminum. Preferably, the animal cage 100 is made of a medium gauge wire mesh material. However, other materials such as plastic or wood may also be used, especially for animals with special needs, such as allergies to specific materials.

The animal cage 100 of the present invention can be of any desired size. In a preferred version, the cage can comfortably house at least one large-breed dog, such as a Rottweiler, a German Shepherd or a Wiemaraner, each of which can weigh up to 130 pounds and are typically between 25-27 inches tall. However, the animal cage 100 of the present invention may also be adapted to house animals as large as horses, sheep, or pigs as well as animals as small as chickens, cats, or rabbits in a convenient and efficient manner.

The invention is not intended to be limited to the examples described above, but rather is intended to be limited only by the claims set out below. Thus, the invention encompasses all different versions that fall literally or equivalently within the scope of these claims.

What is claimed is:

1. A collapsible corner animal cage having a substantially pentagon-like shape comprising:
    a top platform and a bottom platform defining a roof and a floor of the collapsible cage;
    a first side wall (108) having a first upper end rotatably fastening the top platform, a first lower end rotatably fastening the bottom platform;
    a second side wall (110) having a first upper end rotatably fastening the top platform, a first lower end rotatably fastening the bottom platform;
    a first end wall (106) rotatably fastening the bottom platform;
    a second end wall (112) rotatably fastening the top platform;
    a door wall (114) having a left side rotatably fastening the first end wall 106 and a right side rotatably fastening the second end wall (112);
    wherein the top and bottom platforms, door wall, first and second end walls, and first and second side walls define a substantially pentagon-like cage interior when the collapsible cage has an expanded configuration;
    wherein during the transition from the expanded configuration to a collapsed configuration the door wall, first and second end walls and said first and second side walls rotate into the cage interior and the first side wall approaches the second side wall; and
    wherein the door wall comprises a door frame defining an entryway through said door wall, and a door rotatably fastening the door frame along a door hinge.

2. The collapsible corner animal cage of claim 1 wherein the second side wall fastens to the first side wall to define a 90 degree angle between the side walls.

3. The collapsible corner animal cage of claim 1 wherein the bottom platform comprises two panels, each panel having a first side, a second side, a third side, and a fourth side, the panels fastened together at the fourth side to define the floor.

4. The collapsible corner animal cage of claim 1 wherein the top platform comprises two panels, each panel having a first side, a second side, a third side, and a fourth side, the panels fastened together at the fourth side to define the roof.

5. The collapsible corner animal cage of claim 1 further comprising a carrying handle.

* * * * *